United States Patent
Saha et al.

(10) Patent No.: US 7,251,657 B2
(45) Date of Patent: Jul. 31, 2007

(54) METHOD AND SYSTEM FOR IMPLEMENTING DYNAMIC CACHE OF DATABASE CURSORS

(75) Inventors: Debashis Saha, Foster City, CA (US); Srinath Krishnaswamy, Fremont, CA (US); Lakshminarayanan Chidambaran, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 330 days.

(21) Appl. No.: 10/427,838

(22) Filed: Apr. 30, 2003

(65) Prior Publication Data

US 2003/0236780 A1 Dec. 25, 2003

Related U.S. Application Data

(60) Provisional application No. 60/379,663, filed on May 10, 2002.

(51) Int. Cl.
*G06F 17/30* (2006.01)
(52) U.S. Cl. ..................... 707/10; 707/104.1
(58) Field of Classification Search ............ 707/1–10, 707/100–104.1, 200–206; 711/118–132; 709/223
See application file for complete search history.

(56) References Cited

U.S. PATENT DOCUMENTS

| | | | |
|---|---|---|---|
| 5,355,406 A | | 10/1994 | Chencinski et al. |
| 5,826,253 A | * | 10/1998 | Bredenberg ............... 707/2 |
| 6,098,093 A | | 8/2000 | Bayeh et al. |
| 6,115,703 A | * | 9/2000 | Bireley et al. .............. 707/2 |
| 6,230,200 B1 | | 5/2001 | Forecast et al. |
| 6,286,104 B1 | | 9/2001 | Buhle et al. |
| 6,321,235 B1 | * | 11/2001 | Bird .......................... 707/203 |
| 6,338,089 B1 | | 1/2002 | Quinlan |
| 6,338,117 B1 | * | 1/2002 | Challenger et al. ......... 711/122 |
| 6,351,775 B1 | * | 2/2002 | Yu ............................ 709/238 |
| 6,397,253 B1 | | 5/2002 | Quinlan et al. |
| 6,493,718 B1 | * | 12/2002 | Petculescu et al. ......... 707/102 |
| 6,519,643 B1 | | 2/2003 | Foulkes et al. |
| 6,651,142 B1 | * | 11/2003 | Gorelik et al. ............. 711/119 |

\* cited by examiner

*Primary Examiner*—Yicun Wu
(74) *Attorney, Agent, or Firm*—Bingham McCutchen LLP

(57) ABSTRACT

Disclosed are improved methods, systems, and mediums for implementing a dynamic cursor cache. Cached cursors are tagged to facilitate identification and reuse of cursors from a cursor cache. Cursor caches and cursor usage are managed in an integrated and/or coordinated manner between multiple nodes that have related sets of cursors or cursor resources.

34 Claims, 12 Drawing Sheets

Go to Fig. 5b

METHOD AND SYSTEM FOR IMPLEMENTING DYNAMIC CACHE OF DATABASE CURSORS

CROSS-REFERENCE TO RELATED APPLICATIONS

The present application claims the benefit of U.S. Provisional Application Ser. No. 60/379,663, entitled "Session Pooling and Statement Sharing," filed on May 10, 2002, the contents of which are explicitly incorporated herein by reference in its entirety. The present invention is also related to co-pending U.S. patent application Ser. No. 10/427,701, entitled "Method and Mechanism for Implementing Dynamic Sizing of Session Pools," filed on Apr. 30, 2003; and to U.S. patent application Ser. No. 10/428,152, entitled "Method and Mechanism for Implementing Tagged Session Pools," filed on Apr. 30, 2003.

BACKGROUND AND SUMMARY

Many operations performed on information in a database system are executed using database query language statements, such as statements in the structured query language (SQL). SQL is a non-procedural language for accessing and manipulating data in a relational or object-relational database. Procedural languages, such as PL/SQL, may also be used to perform operations in a database system. For purpose of illustration, and not by way of limitation, the rest of this document will be explained with reference to SQL statements and relational database structures such as tables and rows. It is noted, however, that the inventive concepts disclosed herein are applicable to other types of objects, structures, and operations in a database.

A cursor is a handle to a query execution area, e.g., an area in memory in which a parsed SQL statement and other information for processing the SQL statement is stored. In many database systems, a cursor is an available resource for accessing or parsing SQL statements embedded within an application. Cursors enable a SQL statement to retrieve rows from a database table into a given result set, which can then be accessed, displayed, or operated upon.

Typically, a defined sequence of actions is performed to execute a SQL statement. To execute a SQL statement, the cursor is first created, either in conjunction with the SQL query or independently. The cursor may be automatically handled by the database system, or manually controlled by a programmer through an application programming interface. The SQL statement is thereafter parsed, optimized, and executed to produce a set of rows called the result set. The rows in the result set are retrieved ("fetched") either a row at a time or in groups. The cursor can be considered the database query and its result set. A final stage for processing the SQL query statement is to close the cursor.

A significant level of overhead and expense is normally required to create a cursor, particularly due to the sheer amount of work involved to parse a SQL statement and to generate an execution plan for that statement. FIG. 1 is a flowchart illustrating some of the basic compilation steps that may be performed to create a cursor. In this shown approach, the SQL compilation process begins with a parse phase 150. The parse phase is so named because the SQL statement is analyzed and parsed (clause by clause) into its constituent components to create an expression tree (or parse tree). The parse phase involves syntactical analysis where the statement is analyzed for correct syntax (105) followed by a verification action, where among other things, a determination is made whether the referenced objects exist (110). User permissions may be analyzed to determine whether the requester holds sufficient access privileges to the specific objects referenced in the SQL text (115). The parse phase concludes by generating an expression tree (120). Type checking may be performed to engage data type resolution between a client process and a server process, which verifies and corrects data type incompatibilities, for example, in a heterogeneous enterprise network/system (125). An optimizer accepts the parsed and analyzed statement from the parse phase to determine an appropriate method to best execute the particular SQL statement based upon a number of criteria, including gathered statistical information, optimization methodologies, and/or selectivity analysis (130). The result is a memory resident data structure that dictates an execution plan for carrying out the database statement request. A cursor is an example of a memory structure that includes a handle to a memory location where the details and results of a parsed and optimizes statement resides. A cursor in this context is distinguishable from the use of the term cursor from other data processing contexts, such as client-side procedural language originated cursors used to aid data table processing or as a pointer to a screen location.

Due to this expense, it is often inefficient to recreate a cursor each and every time a client requests execution of a particular SQL statement. Instead, the cursor can be cached and reused to execute the same SQL statement. Even if a first SQL statement is not exactly the same as a second SQL statement, techniques have been developed to identify when cursors can be shared between statements that are sufficiently similar. Once example approach for sharing cursors and execution plans for database statements is described in co-pending U.S. application Ser. No. 10/086,277, filed on Feb. 28, 2002, entitled "Systems and Methods for Sharing of Execution Plans for Similar Database Statements", which is hereby incorporated by reference in its entirety.

Embodiments of the present invention provide improved methods, systems, and mediums for implementing a dynamic cursor cache. According to an embodiment, cached cursors are tagged to facilitate identification and reuse of cursors from a cursor cache. According to another embodiment, cursor caches are managed in an integrated and/or coordinated manner between multiple nodes that have related sets of cursors or cursor resources. Further details of aspects, objects, and advantages of the invention are described in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION OF EMBODIMENT(S)

Embodiments of the present invention provide methods, systems, and mediums for implementing a tagged and/or dynamic cursor cache.

Figure 2:
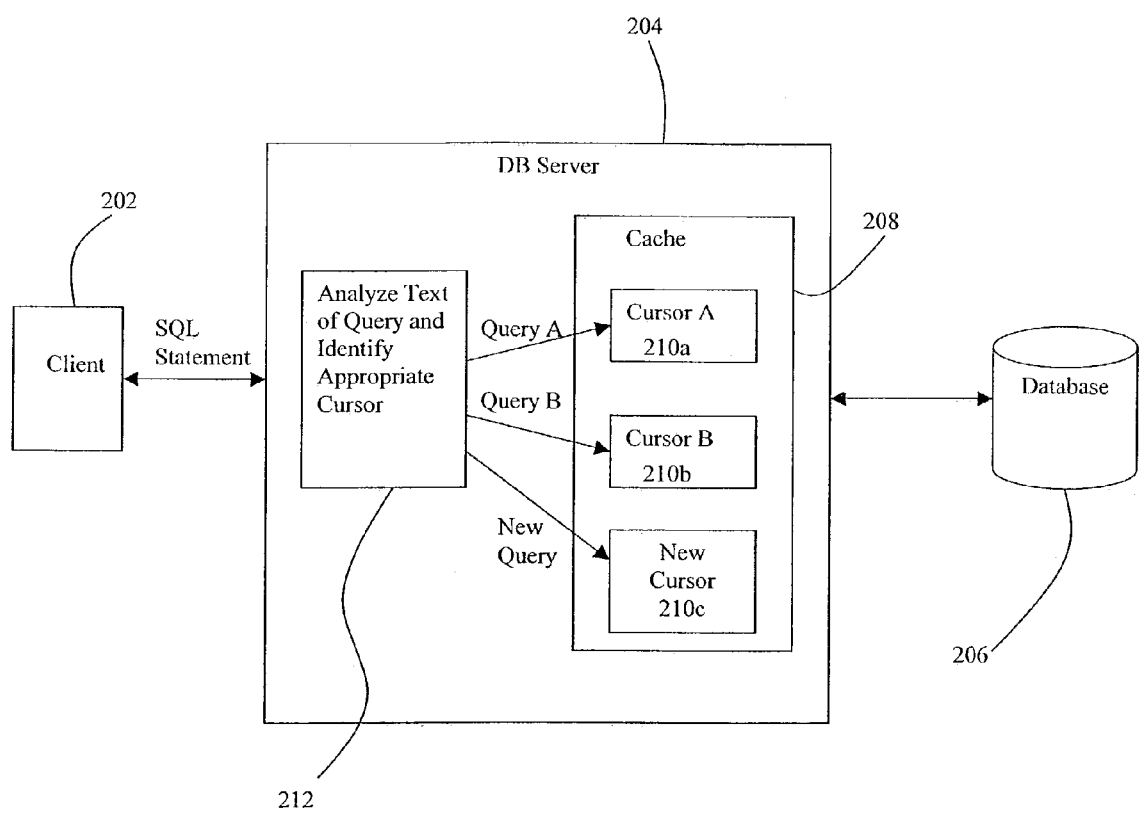
FIG. 2 depicts an architecture for implementing cursor caching.

FIG. 2 shows a example client-server architecture for implementing a cursor cache. SQL query statements are issued by a client 202, which are sent to and processed by a database server 204 to generate a result set. The database server may access database 206 to execute the SQL statements. A cache 208 is maintained at database server 204 to hold one or more database cursors. When database server 204 processes and executes a SQL statement on behalf of client 202, the resulting cursor is placed in cache 208. In the present example, the database server 204 has executed two SQL statements resulting in a first cursor 210a and a second cursor 210b to be stored in cache 208. Cursor 210a corresponds to a first distinct Query A and cursor 210b corresponds to a second distinct Query B.

At a later point in time, the client 202 may issue another SQL statement to be executed by database server 204. A processing module 212 at database server 204 analyzes the SQL statement to determine whether a cached cursor can be re-used to handle the SQL statement. The module 212 analyzes the text string of the SQL statement to determine whether the SQL statement corresponds with a prior SQL statement that has been used to create a cached cursor. If so, then the cached cursor is employed to handle execution of the SQL statement, thereby saving the expense of having to parse and optimize the statement create a new cursor. Instead of creating a new cursor, the cached cursor can be re-executed to generate a new result set for the new SQL statement.

In the example of FIG. 2, if the new SQL statement corresponds to the prior Query A, then the cached cursor 210a associated with Query A can be re-used to execute the new SQL statement. If the new SQL statement corresponds to the prior Query B, then the cached cursor 210b associated with Query B can be re-used to execute the new SQL statement. If, however, the new SQL statement does not correspond to the statement corresponding to any cached cursor, then a new cursor 210c will be created to handle the new SQL statement.

One circumstance in which a cached cursor can be re-used is if the new SQL statement is identical to the prior query statement used to compile and create the cached cursor. In this approach, the module 212 performs a matching/comparing action to determine whether the text string of the new SQL statement exactly matches the text string of the earlier SQL statement. Even if the new SQL statement and the earlier SQL statement are not identical, the cursor created for the earlier SQL statement can still be used to process the new SQL statement if the two statements are similar enough. For example, if the two statements only differ by only one or more literals, then the cursor can be created for a SQL statements having a "placeholder" (e.g., a bind variable) at the location of the literal, and the cursor re-used for any incarnation of that SQL statement having different literal values. One approach for implementing this type of cursor sharing is described in co-pending U.S. application Ser. No. 10/086,277, filed on Feb. 28, 2002, entitled "Systems and Methods for Sharing of Execution Plans for Similar Database Statements", which is hereby incorporated by reference in its entirety.

According to one embodiment of the invention, each cached cursors can be associated with a "tag" to facilitate identification and re-use of the cached cursors. The tag is a unique label or handle to its associated cursor.

Figure 3:
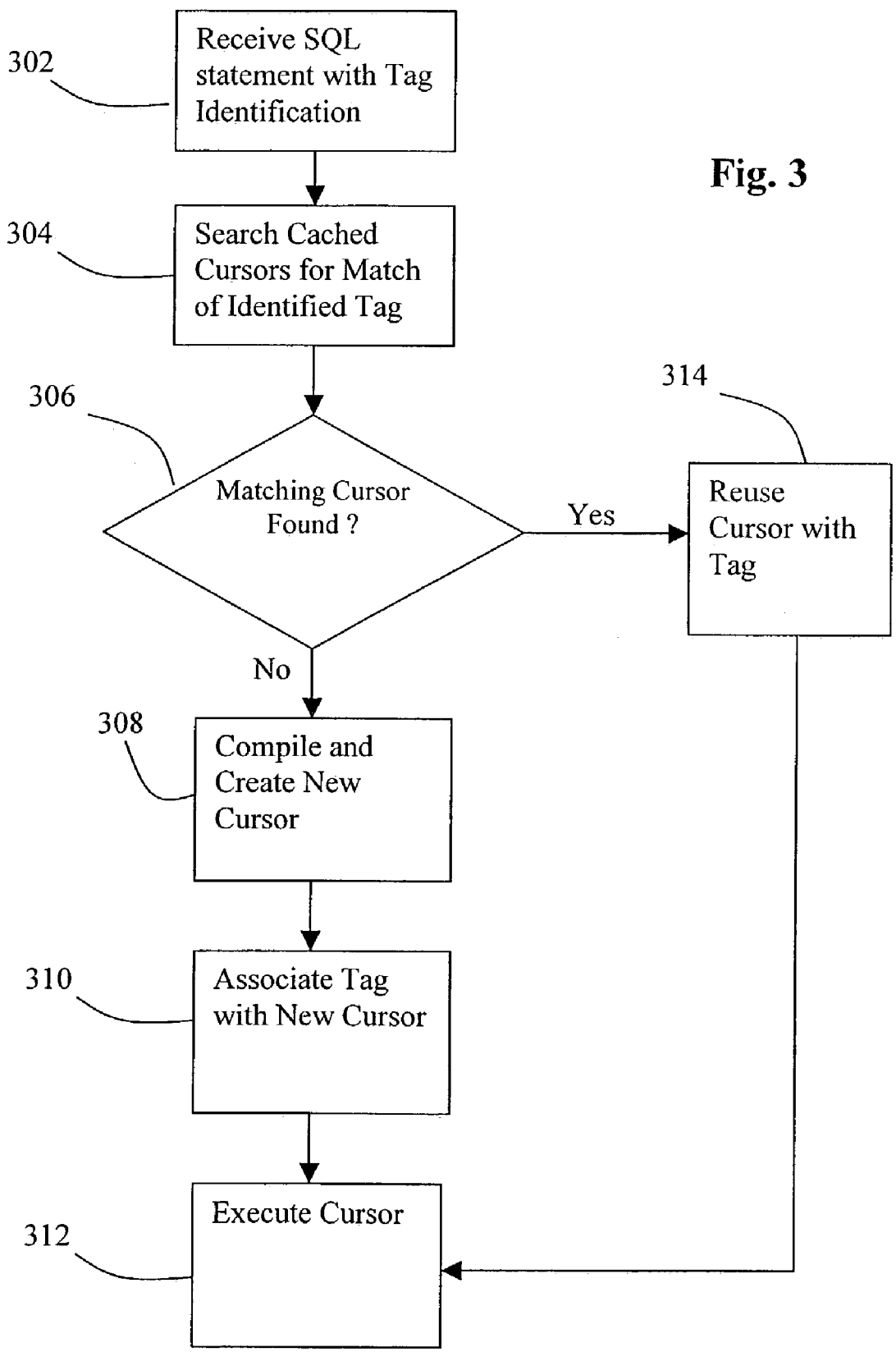
FIG. 3 shows a flowchart of a process for tagging cursors.

FIG. 3 is a flowchart of a process for implementing tagged cursors according to an embodiment of the invention. Initially, a SQL statement is received at the server for processing (302). The SQL statement includes or is associated with a cursor tag. The tag comprises a visible label that can be used to identify a specific cursor in the cache. The cursor cache is searched for a cursor associated with the appropriate tag (304) and a determination is made whether such a cursor exists in cache (306). If so, then the identified cursor from the cursor cache is re-used to execute the SQL statement (312, 314).

In one embodiment, if a cursor having a matching tag is not found in cache, then a further action is taken to match the text string of the SQL statement with the SQL statements associated with the cached cursors in the cache. If such a match is found, then the identified cursor from the cursor cache is re-used to execute the SQL statement (312, 314). The identified cursor can then be associated with the requested tag so that future SQL requests will be directed to the same cursor. In an alternate embodiment, if a cursor having a matching tag is not found, then no action is taken to match the text string of the SQL statement. Instead, the process proceeds directly to 308.

Figure 1:
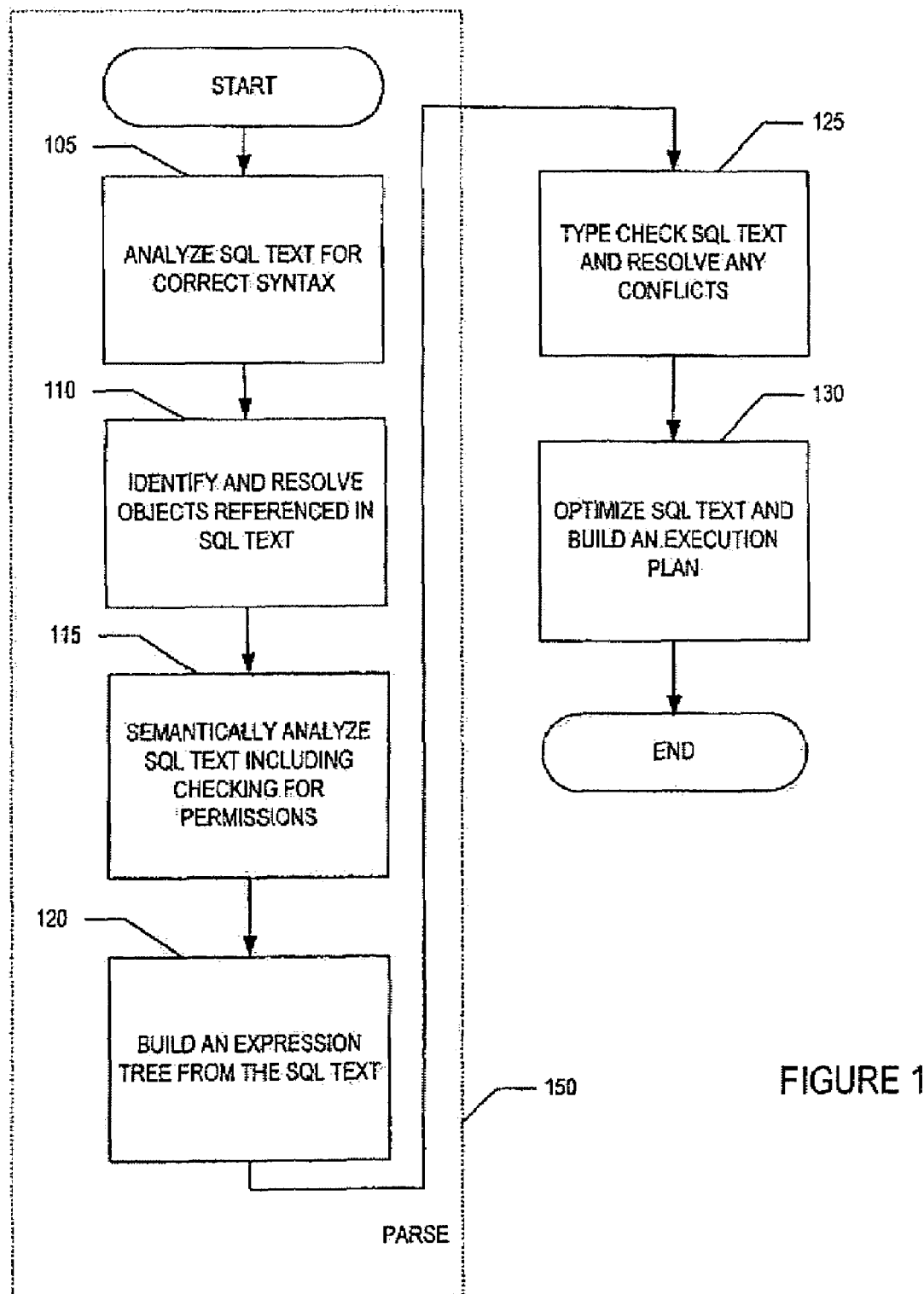
FIG. 1 shows a flowchart of a process for implementing a cursor.

At 308, if a cursor having the matching tag is not found, then the SQL statement is compiled and a new cursor is created to execute the requested query. Some or all of the actions described with respect to FIG. 1 may be taken to create the new cursor. A new tag is associated with the new cursor (310) and the new cursor is executed to respond to the SQL statement (312). The new tag may be assigned by the system and reported to the user/client, e.g., using the tag identified by the user/client when issuing the SQL statement. Alternatively, the user/client may perform the action of selecting the tag that is associated with the new cursor. In one embodiment, the cursor tag is maintained in a user-visible manner such that a user/client can identify the tags associated with specific cursors in the cache. One approach for tracking this information is to maintain a searchable and accessible table structure that identifies each cursor in the cache along with the cursor's associated tag.

After (or during) the execution of the new tagged cursor, the result set for the cursor is made available to the client. When execution has completed, the new tagged cursor is maintained in cache until it is needed again by the same or different client. The tagged cursor is maintained in memory until it is no longer needed or until the system has determined that it should be deleted from cache and its associated resources released. This may occur, for example, based upon the LRU (least recently used) algorithms used by systems to age out allocated resources, by prioritization of different cursors, or during the process of dynamically adjusting the contents of the cursor cache between nodes, as described in more detail below.

Figure 4:
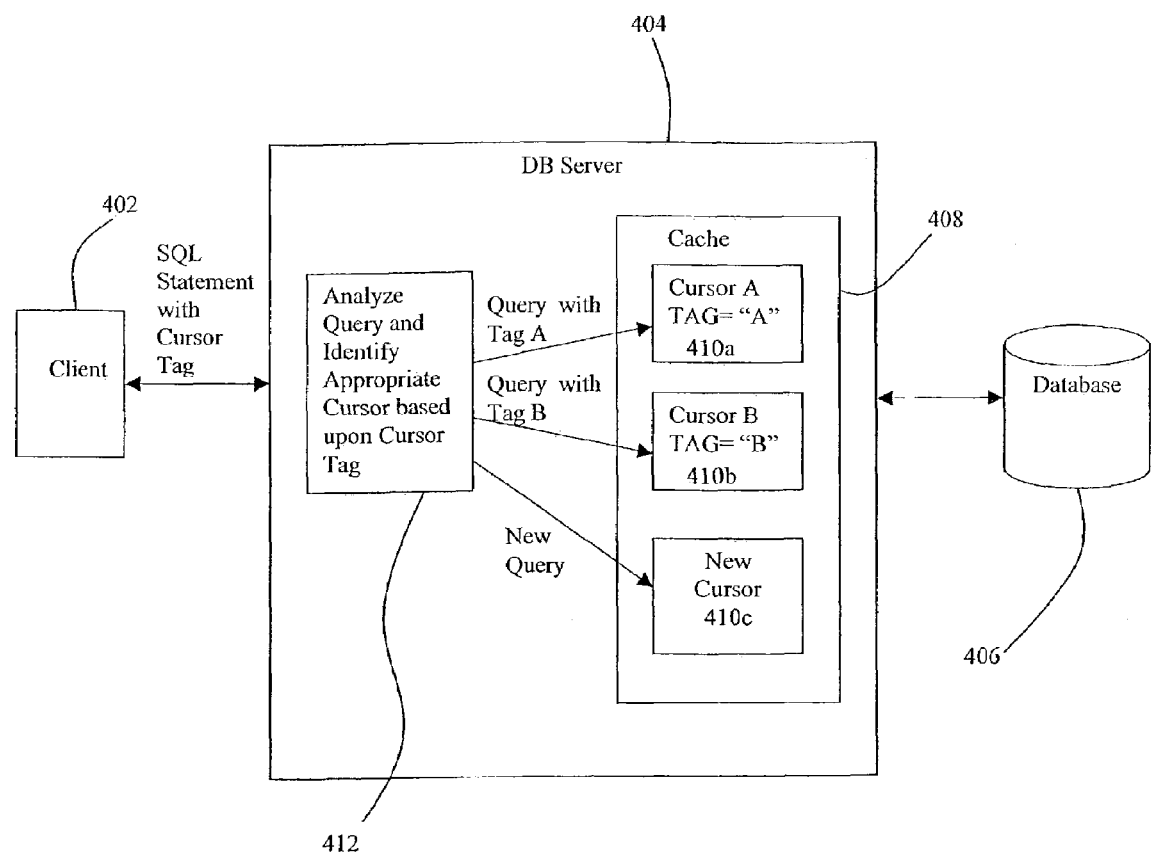
FIG. 4 illustrates cursor tags in a cursor cache.

FIG. 4 shows a example architecture for implementing tagged cursors in a cursor cache. The database server 404 includes a cache 408 containing one or more cached database cursors. At least some of the cursors contained in cache 408 are tagged. Assume that in the recent past, the database server 404 has executed two SQL statements resulting in a first cursor 410a and a second cursor 410b to be stored in cache 408. Cursor 410a was created in response to a Query A and is associated with a tag "A". Cursor 410b was created in response to a Query B and is associated with a tag "B".

A client 402 issues a SQL statement to be executed by a database server 404, in which the SQL statement includes or is associated with a request for a tagged cursor. A processing module 412 at database server 404 analyzes the tag associated with the SQL statement to determine whether a tagged cursor in the cache 408 corresponds to the tag. If so, then the cached cursor having the appropriate tag is assigned to handle execution of the SQL statement, thereby saving the expense of having to parse and optimize the statement create a new cursor.

In the example of FIG. 4, if the new SQL statement requests a cached cursor having the tag "A", then the cached cursor 410a associated with Query A is reused to execute the SQL statement. If the new SQL statement requests a cached cursor having the tag "B", then the cached cursor 410b associated with Query B is re-used to execute the SQL statement. If a corresponding tagged cursor cannot be found, then a new cursor 410c is created to execute the SQL statement. In one embodiment, the new cursor 410c is associated with the tag requested by the client 402.

When a cursor is created at a first node to process a query, that query may also cause a related cursor or related cursor resources at a second node to be allocated. Even if an entire "cursor" is not being used or cached at a remote node, using and/caching a cursor at a local node may still require some system resources to be allocated at the remote node to support the processing and existence of the cursor at the local node.

Figure 5A:
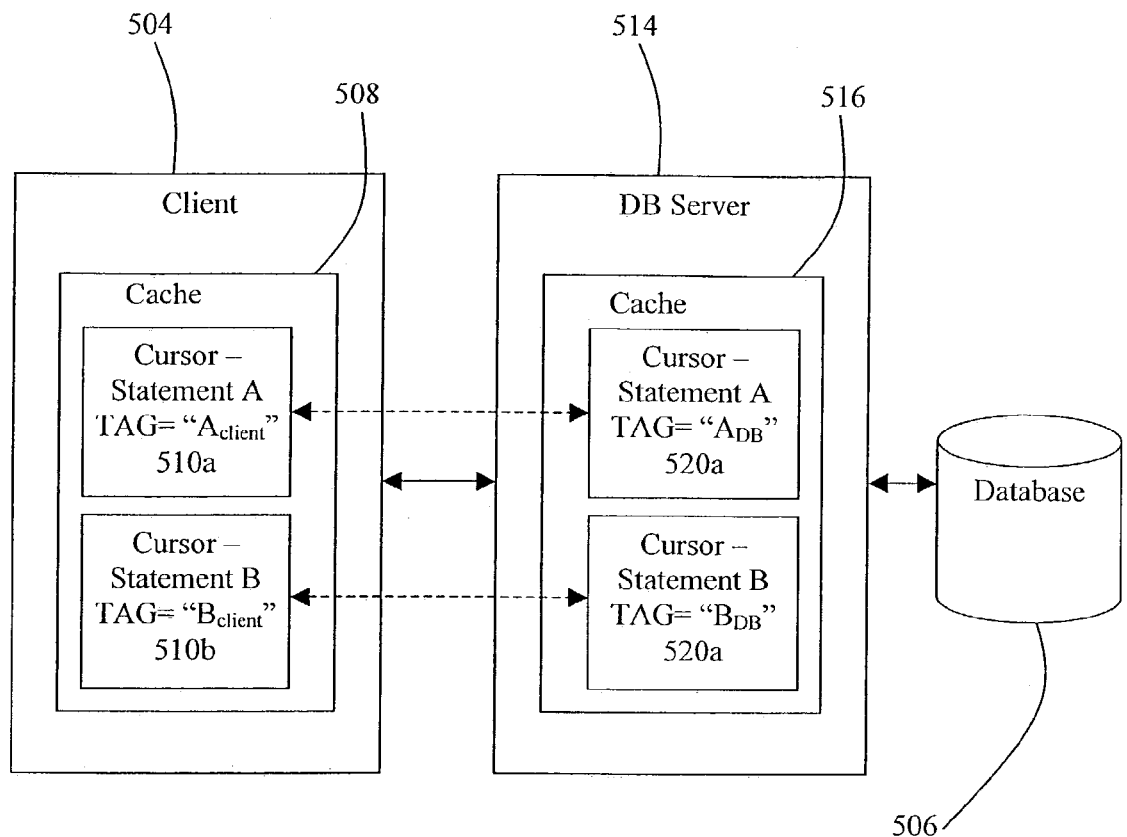
FIGS. 5a-5d illustrate a process for dynamically adjusting cursor usage and/or caching in a coordinate manner between nodes.

As an example, consider the client-server configuration shown in FIG. 5a. When a SQL statement is issued by client 504 to database server 514, a cursor is created within cache 516 at database server 514 to process and executed the SQL statement. As noted above, multiple cursors (tagged or untagged) may be cached within the cache 516 at database server 514. A cached 508 may exist at client 514 to hold some or all of the cursor information, such as the result set from executing the SQL statement. One reason for implementing a cursor cache 508 at client 514 to store cursor information (e.g., result set information) is to implement a scrollable cursor at client 504. An example approach for using multiple caches to implement a scrollable cursor is described in U.S. Pat. No 6,973,457, filed May 10, 2002 and issued on Dec. 6, 2005, entitled METHOD AND SYSTEM FOR SCROLLABLE CURSORS, which is hereby incorporated by reference in its entirety.

Therefore, creating and/or caching a cursor at a first node may cause or necessitate the allocation of some related resources or an entire cursor at a second node. This is acceptable if both nodes have sufficient resources to allow this allocation of resources at the nodes. However, a problem arises if one of the nodes does not have sufficient available resources to maintain this type of cursor usage, even if desired by the other node.

Figure 8:
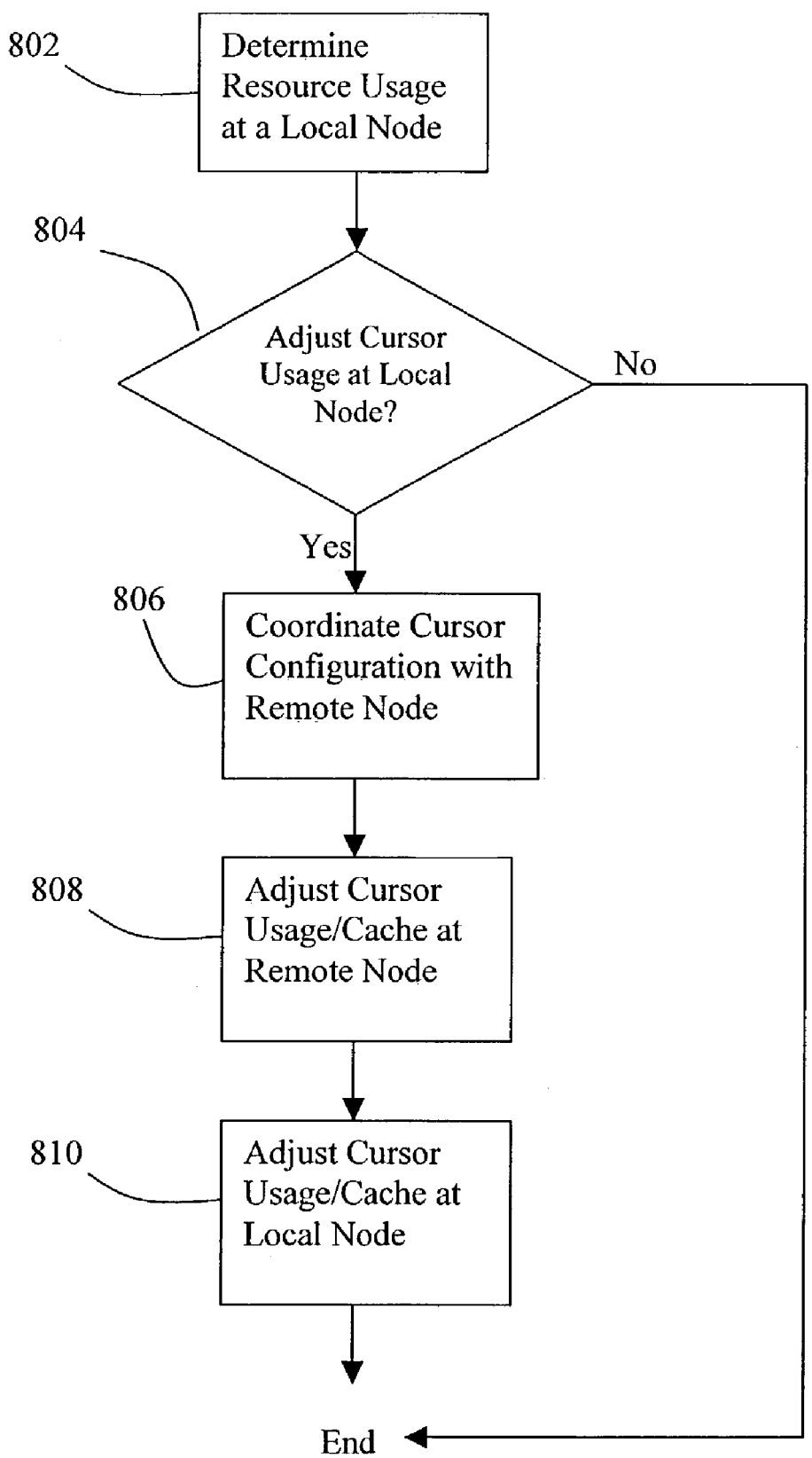
FIG. 8 shows a flowchart of a process for dynamically adjusting cursor usage and/or caching in a coordinate manner between nodes.

One embodiment of the invention is directed to dynamic adjustment of cursor usage or caching based upon integration, communication and/or coordination between different nodes in a distributed computing system. FIG. 8 shows a flowchart of a process for dynamically adjusting related cursor caches according to an embodiment of the invention. The first action is for a local node to determine its local resource usage status, e.g., at its local cursor cache (802). This action may be prompted by a change in conditions at the local node that would necessitate a need to change the size or configuration of its cursor cache. For example, the initial conditions of the local node may allow 100 open cursors, but due to a change in operating conditions, the local node may no longer be able to support this number of open cursors. This change in conditions may be evidenced by diminished performance or worsened service times at the local node.

A determination is made whether the size or configuration of the local cursor usage/caching at the first node should be adjusted (804). This would occur, for example, if the diminished performance is caused by excess resource usage by cursors at the local node. If so, then information and messages are sent between the local node and a remote node to coordinate adjustment of cursor usage/caching (806). Some examples of actions that can be taken in a coordinated manner is to adjust cursor usage is to dynamically change the size of a cursor cache, to change the contents of a cursor cache, to close cursors, or to de-allocate cursor-related resources at one or both nodes. The information that could be sent between the nodes could include, for example, a message from a server to a client informing the client that there are too many open cursors and that some cursors need to be de-allocated or closed.

The client and the server can communicate to coordinate the parameters of the adjustment that must be made to cursor usage to resolve the problem. In this approach, the client and the server make an integrated decision to identify cursors/resources to close and/or to de-allocate from cache. Alternatively, either the client or the server can unilaterally make a local adjustment and communicate that adjustment to the other node so that related resources at the other node can be correspondingly adjusted. In this alternate approach, one of the nodes would close a selected cursor, e.g., using an LRU or prioritization algorithm, and then communicate the identity of that cursor to the other node so that related resources or the related cursor at the other node can be likewise closed/de-allocated. Therefore, based upon the coordinated adjustments, the cursor usage/caching at the remote node is adjusted (808) and/or the cursor usage/caching at the local node is adjusted (810).

Referring back to the example of FIG. 5a, assume that the cursor 510a in the client cache 508 is related to the cursor 520a in the server cache 516, and that cursor 520a in server cache 516 exists only to service the needs of cursor 510a at client 504. Similarly, assume that the cursor 510b in the client cache 508 is related to the cursor 520b in the server cache 516 and that cursor 520b in server cache 516 exists only to service the needs of cursor 510b at client 504. Consider if a determination had been made that insufficient resources exist at database server 514 to continue to maintain both open cursors 520a and 520b at server cache 516. Feedback can be provided to client 504 to provide notification of this lack of available resources at database server 514. The feedback may also include instructions informing client 504 to reduce the number of open cursors at client 504.

Figure 5B:
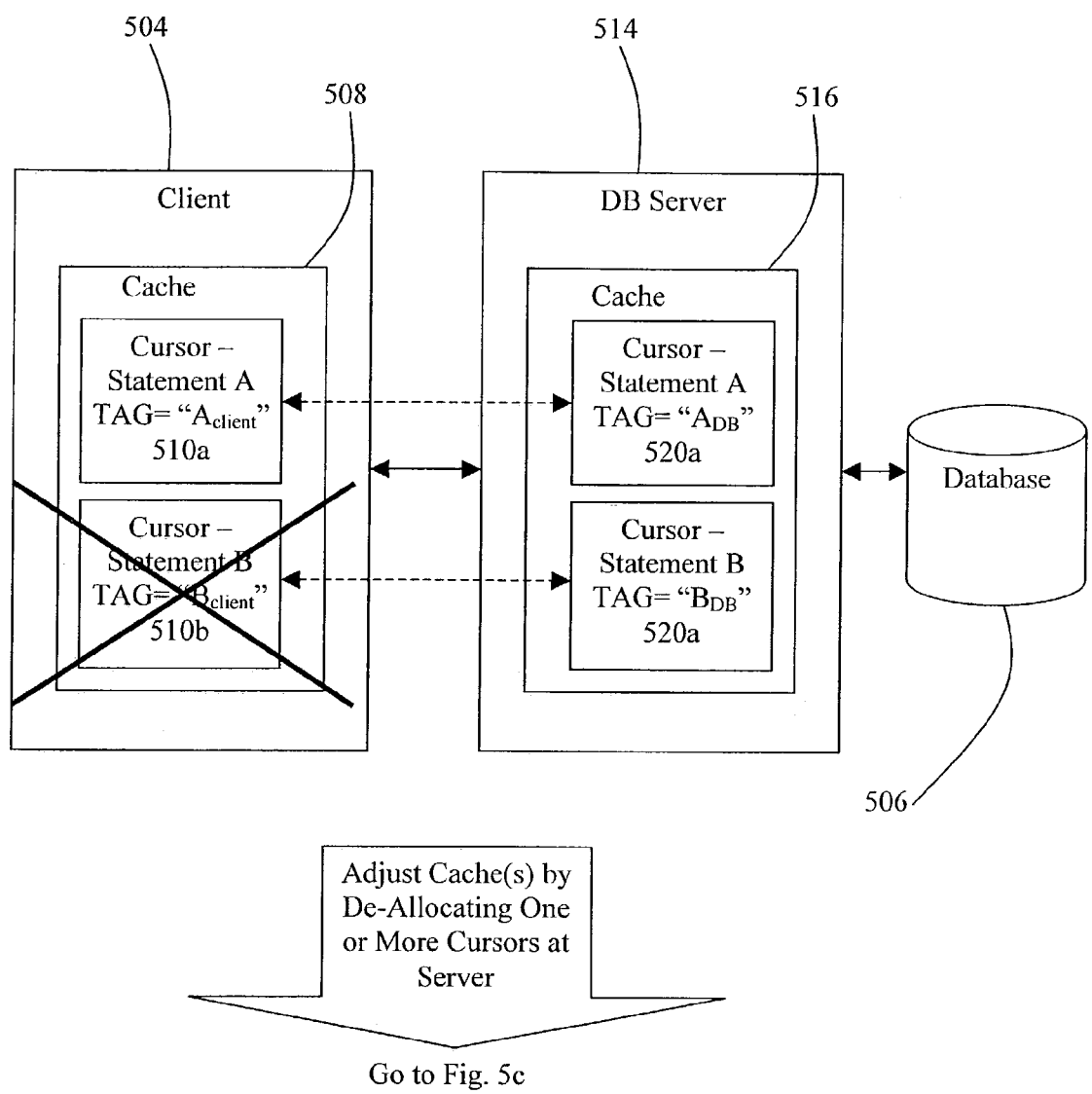

With reference to FIG. 5b, client 504 will respond to the communication from database server 514 by identifying one or more cursors to close/de-allocate. In the present example, cursor 510b has been identified as the appropriate cursor to de-allocate from client cache 508. This selection could have been made, for example, because cursor 510b was the least recently used cursor in client cache 508. Client 504 will communicate to database server 514 to identify which cursor has been de-allocated from its local client cache 508.

Figure 5C:
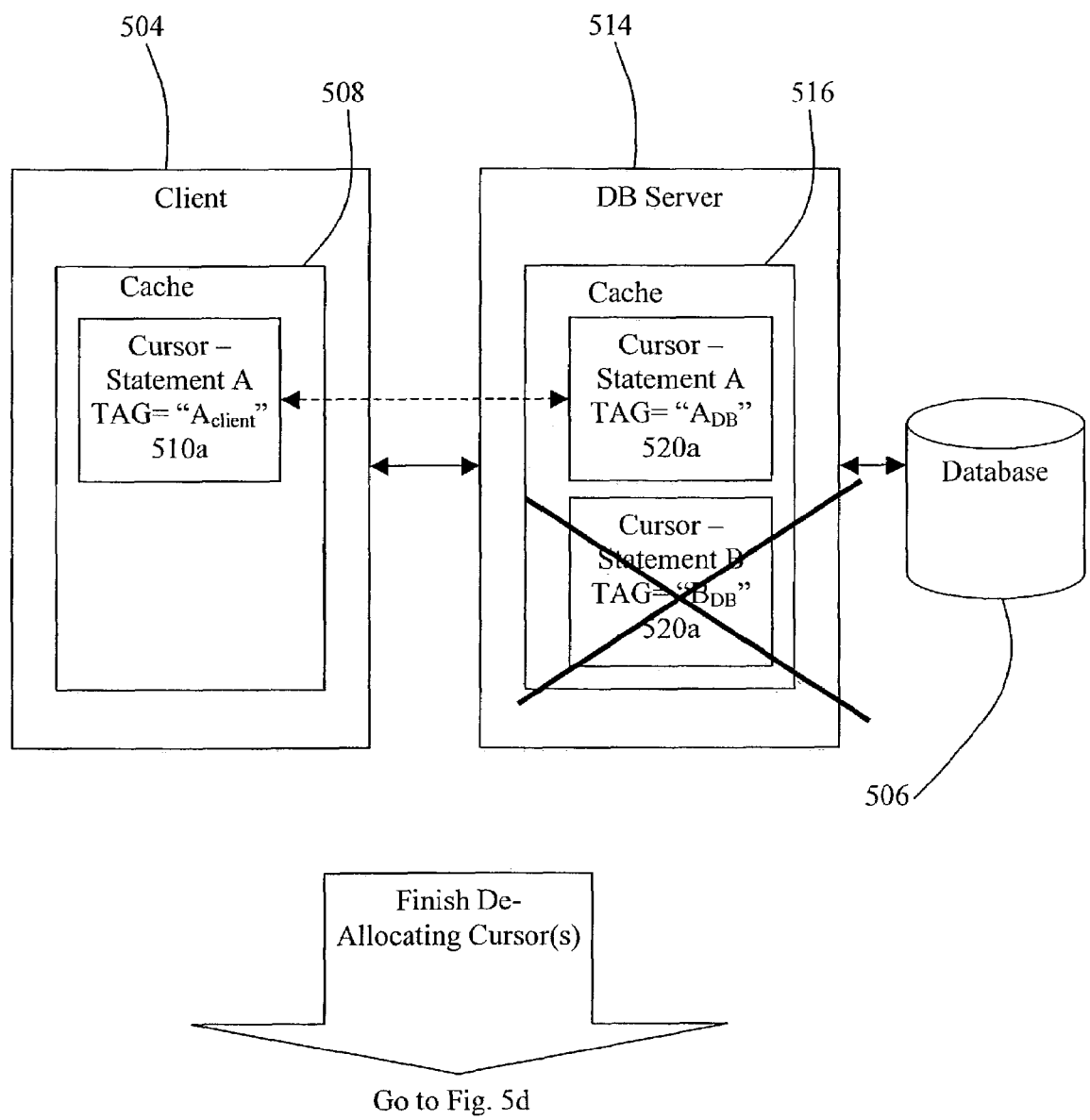
Figure 5D:
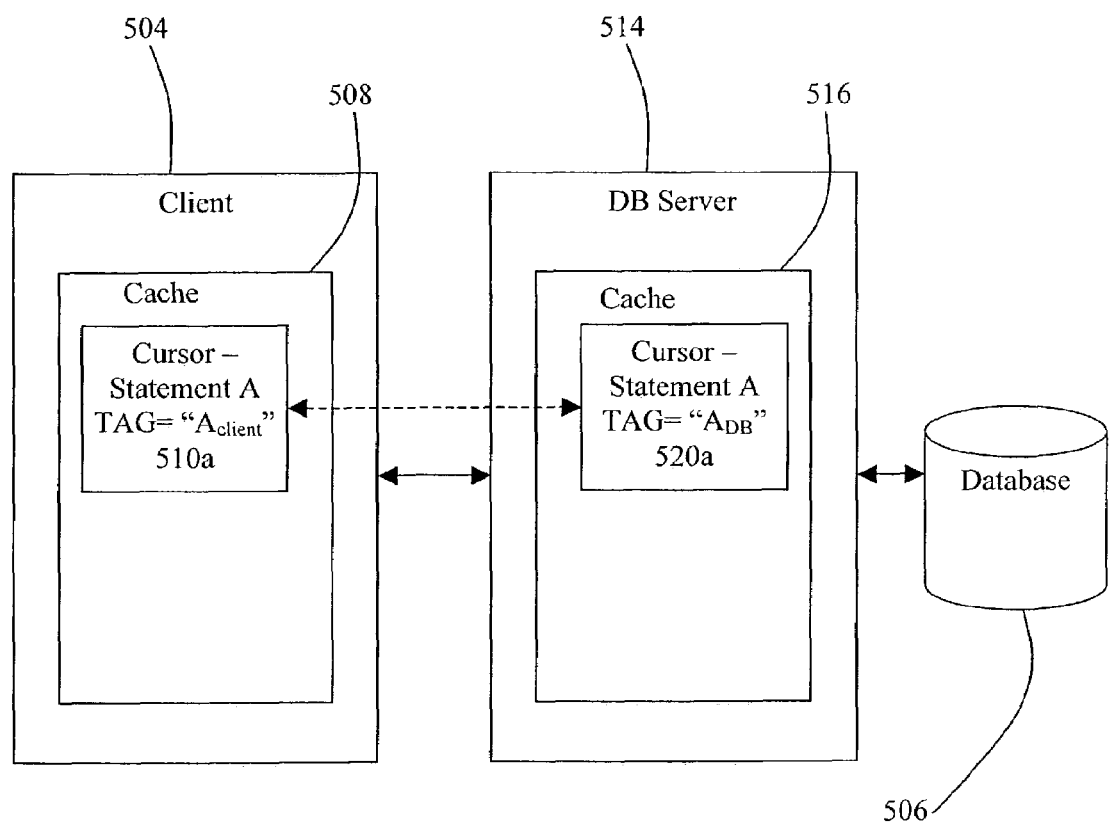

Referring to FIG. 5c, database server 514 will de-allocate the resources/cursor related to the cursor that was de-allocated from the client 504. Here, cursor 510b was closed and de-allocate from client cache 508. Therefore, its related cursor 520b in server cache 516 is also identified for de-allocation. FIG. 5d shows the results from this example approach for dynamic coordination and adjustment of the cursor usage and caching between the related nodes. It can be seen that only cursor 510a at client 504 and its related cursor 520a at server 514 remain after client cache 508 and server cache 516 have been dynamically adjusted to close cursors 520a and 520b.

Figure 6:
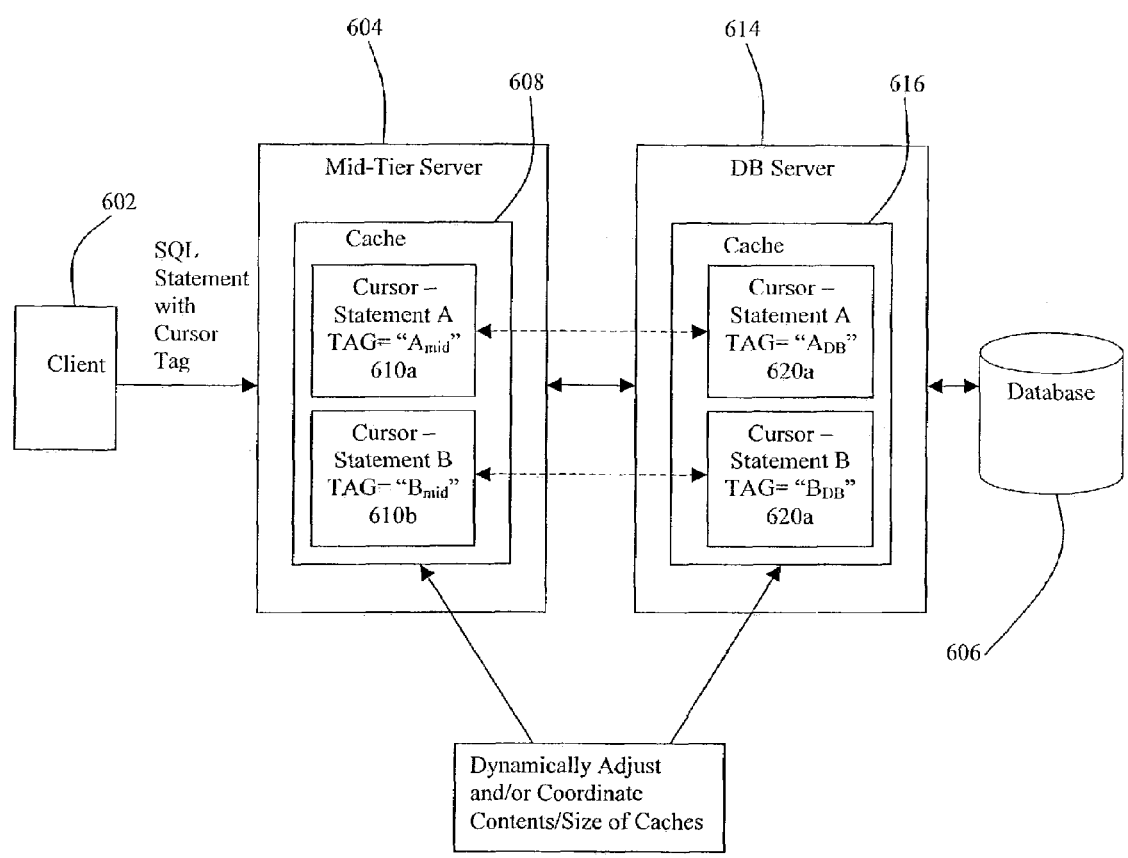
FIGS. 6 and 7 illustrate example applications for dynamically adjusting cursor caches.

The same process can be applied to dynamically adjust cursor usage and caching between two servers. Referring to FIG. 6, shown is a three-tier architecture that includes a back-end resource server (e.g., database server 612) to manage and store access to data resources, a middle-tier server 604 (e.g., an application server or web server) and any number of client applications 602 (e.g., a web browser application). In a common use for this type of architecture, a web browser at a client 602 will seek to access a particular web page. The web page may include or incorporate data from a back-end database 606 that is managed by database server 614. This type of request can be made, for example, as a specific URL or a HTML-based statement requesting data to be displayed on the web browser. The request is sent from client 602 to a middle tier server 604. The middle tier server 604 will have sufficient information about the location of the data to be able to route the request to the one or more specific database servers 614 that can fulfill the request and obtain the requested data from database 606. The requested data may be routed back through middle tier server 604, where it could be appropriately packaged for display on the web browser at client 602.

In this type of system architecture, a query from client 602 may cause a "thin" cursor to be created and/or cached at middle tier server 604. Instead of including all of the contents of a full cursor such as the execution plan, result set, and parse information, the thin cursor at the middle tier server 604 may contain far less information, such as the cursor identifier, the SQL statement, statement handle data structures, and references to bind and define the handle. The corresponding cursor that is more robust and resource-intensive may be created and cached at database server 614. A cache 608 may exist to hold cursor or cursor resources at middle tier server 604. A cache 616 may exist to hold cursor or cursor resources at database server 614. In this situation, the cursors 620a and 620b at the database server 614 may be created and maintained by necessity based upon opening cursors 610a and 610b at middle tier server 604.

In this type of architecture, a possible problem arises when less resource-intensive cursors are opened at the middle tier server 604 that necessitates opening and/or caching of corresponding cursors 620a and 620b at database server 614 that are more resource-intensive. This is acceptable if both the middle tier server 604 and the database server 614 have sufficient resources to allow this allocation of resources. However, a problem arises if the database server 614 does not have sufficient available resources to maintain this type of cursor usage. Since the middle tier server 604 uses less resources to maintain its cursors, excessive resource burdens on the entire system caused by having too many open cursors at middle tier 604 may not be readily apparent to and corrected by the middle tier server 604.

The present invention can be used to coordinate and integrate cursor usage to address this type of problem. In particular, consider if it has been determined that insufficient resources exist at database server 614 to continue to maintain both open cursors 620a and 620b at server cache 616. Middle tier server 604 and database server 614 will coordinate to dynamically adjust cursor usage and/or caching to reduce the excess resource consumption at database server 614. For example, feedback can be provided to middle tier server 604 to provide notification of this lack of available resources at database server 614. The feedback may also include instructions informing middle tier server 604 to reduce the number of open cursors at middle tier server 604. The middle tier server 604 may respond to the communication from database server 614 by identifying one or more cursors to close/de-allocate. The middle tier server 604 can identify an appropriate cursor to de-allocate from middle server cache 608, e.g., using a LRU algorithm. Middle tier server 604 will communicate to database server 614 to identify which cursor has been de-allocated from its local server cache 608. Database server 614 will thereafter de-allocate the resources/cursor related to the cursor that was de-allocated from the middle tier server 604.

Figure 7:
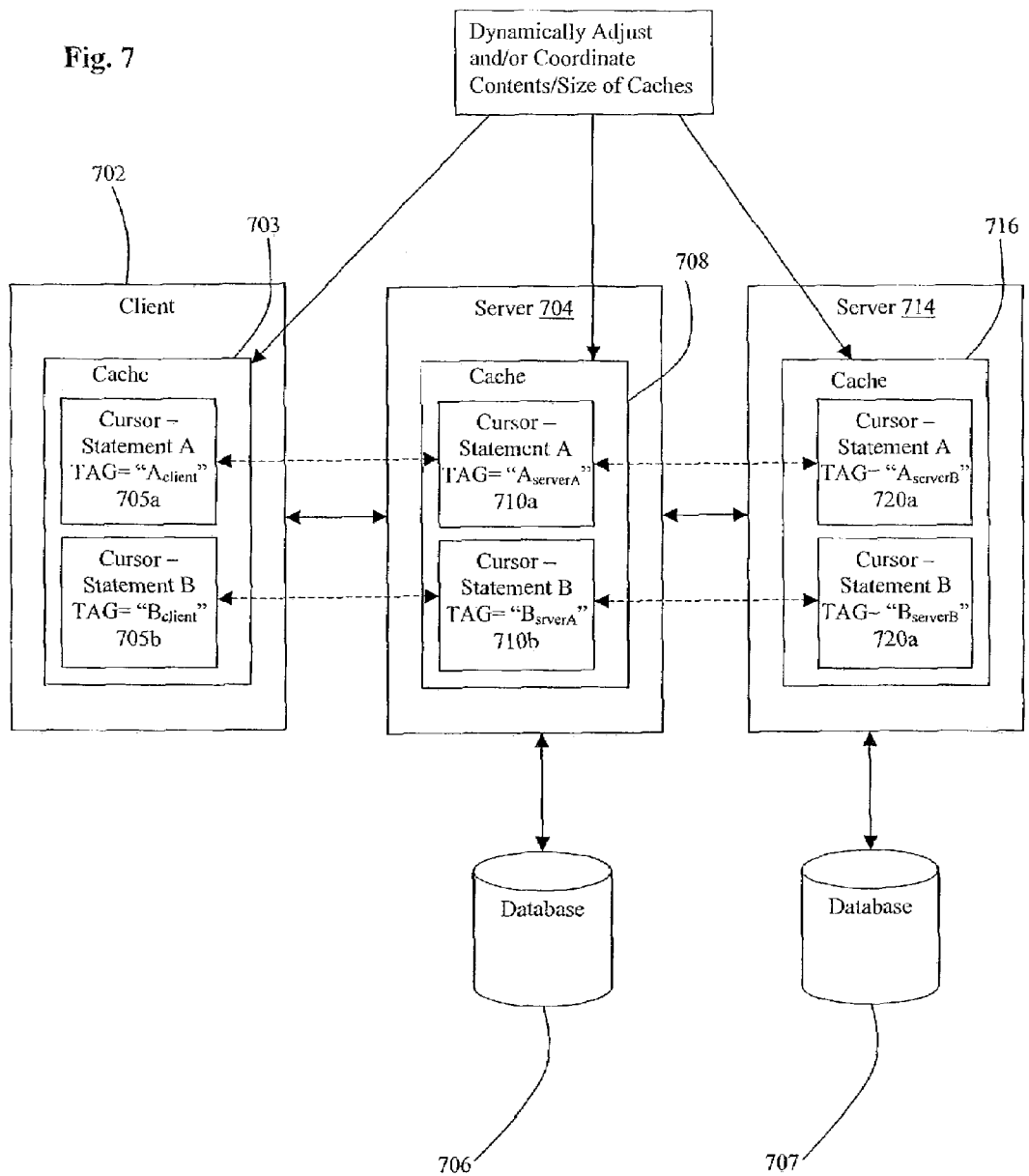

The present process can be applied to dynamically adjust cursor usage and caching between any N numbers of nodes. For example, referring to FIG. 7, shown is a multi-level architecture for implementing distributed database query processing, e.g., to process a remote mapped query. This may involve a query in which data that is accessed to respond to the query exists at a remote location. To illustrate distributed database query processing with remote mapped queries according to an embodiment of the invention, shown in FIG. 7 is a client device 702, a first server 704, and a second server 714. A client cache 703 may exist to locally cache information relating to the cursor for a query, e.g., to cache rows for a result set that is returned to the client 702 from first server 704. The first server 704 and second server 714 may each maintain their own caches 708 and 716, respectively, to locally cache cursors and related information.

Consider the following query that is issued by client 702:

SELECT *
FROM table_at_server_704 A
WHERE EXISTS (SELECT * from table_at_server_714 B
WHERE A.value=B.value);

This query seeks all rows from a table at server 704 in which the "value" column of the table at server 704 equates to the "value" column at a table at server 714. Therefore, first server 704 requires access to data from second server 714 to process the query.

This type of remote mapped query can be satisfied by either moving the cursor to where the data is located or by moving the data to where the cursor is located. Various efficiency measures may be considered in determining whether the data or the query should be sent to a remote location, e.g., network efficiency or cache usage measures. For example, if the volume of data to be evaluated by the query is much smaller at first server 704 than at second server 714, it is likely to be more efficient to send the query and the data from first server 704 to the second server 714 for processing. On the other hand, if the volume of data is much greater at first server 704, then it is likely more efficient to send the data to be considered from second server 714 to first server 704 to process the query.

Here, first server 704 requires access to data from second server 714 to process the query. If the query is to be processed at second server 714 (i.e., a corresponding query is sent from first server 704 to second server 714), then first server 704 essentially becomes a client to second server 714. It is noted that second server 714 may itself need to remotely map a query to another server to process the query, which remotely maps the query to another server, etc., in an indefinite chain of remotely mapped queries.

In this type of architecture, multiple levels of caches may exist to store cursor state and cursor information at each of the computing levels needed to process the query. The client 702 may include a cache 703 to hold cursor or cursor information 705*a* and 705*b*. A cache 708 may exist to hold cursor or cursor resources at the first server 704. A cache 716 may exist to hold cursor or cursor resources at the second server 714. In this example, the cursors 705*a*, 710*a*, and 720*a* are all related, and may be created, maintained or cached in a related manner. Similarly, the cursors 705*b*, 710*b*, and 720*b* are all related and may be created, maintained, or cached in a related manner.

The present invention can be used to coordinate and integrate related cursor usage at multiple nodes. For example, assume that it has been determined that insufficient resources exist at second server 714 to continue to maintain both open cursors 720*a* and 720*b* at server cache 716. The nodes in this architecture will use the process of FIG. 8 to dynamically coordinate and adjust cursor usage and/or caching to reduce the excess resource consumption at second server 714. For example, feedback can be provided to first server 704 and/or to client 702 to provide notification of this lack of available resources at second server 714. The feedback may include instructions informing first server 704 to reduce the number of open cursors at first server 704. Alternatively, the feedback may include instructions informing first server 704 to inform client 702 to reduce the number of open cursors at client 702.

Either, or both, the first server 704 and/or the client 702 may respond to the communication from the second server 714 by identifying one or more cursors to close/de-allocate. If the client 702 identifies the initial cursor to de-allocate, then the client 702 will communicate to identify which cursor has been de-allocated from its local server cache 703. The first server 704 and the second server 714 will thereafter deallocate the resources/cursor related to the cursor that was de-allocated from the client 702. If the first server 704 is first to identify the initial cursor to de-allocate, then the first server 704 will communicate to identify which cursor has been de-allocated from its local cache 708. The client 702 and the second server 714 will thereafter de-allocate the resources/cursor related to the cursor that was de-allocated from the first server 704.

SYSTEM ARCHITECTURE OVERVIEW

Figure 9:
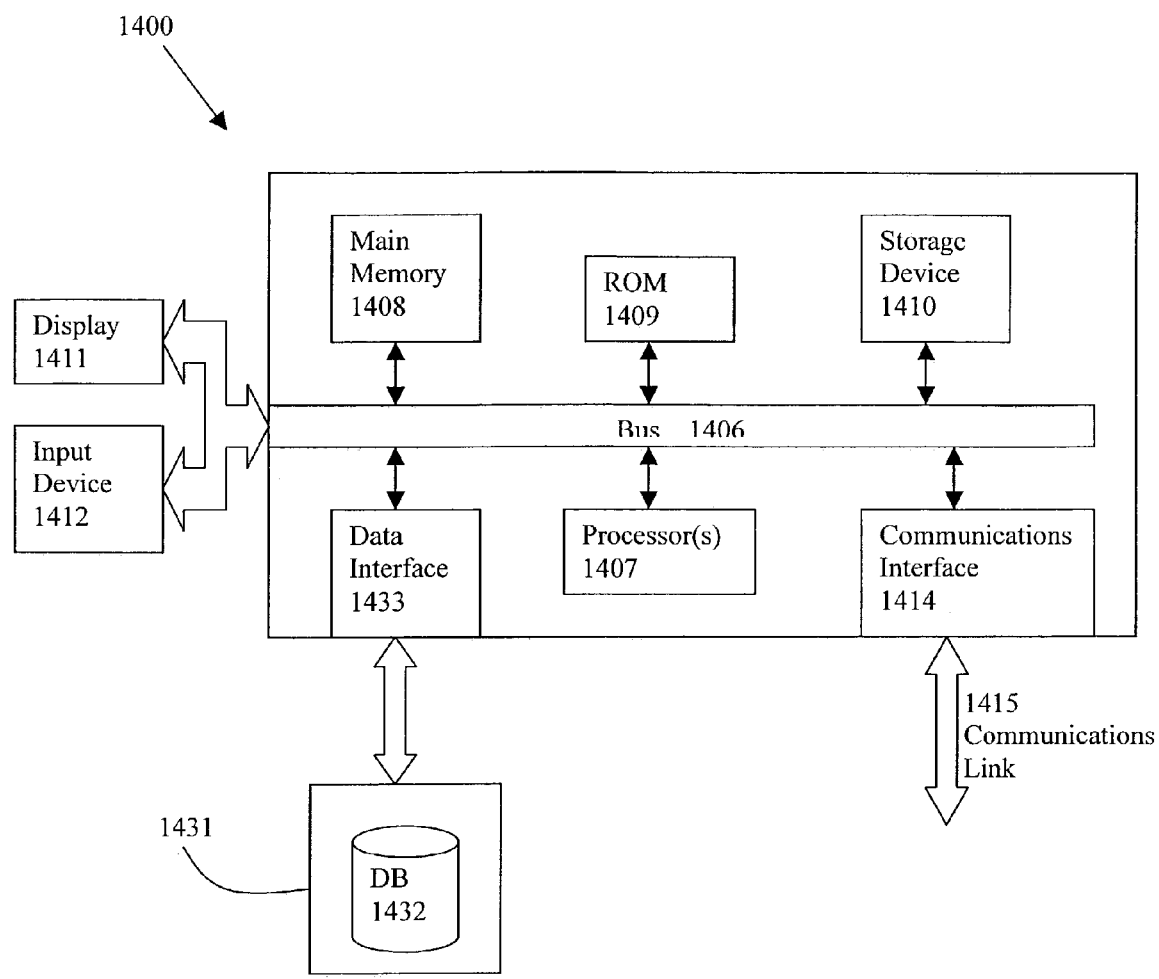
FIG. 9 is a diagram of a system architecture with which the present invention can be implemented.

The execution of the sequences of instructions required to practice the invention may be performed in embodiments of the invention by a computer system 1400 as shown in FIG. 9. As used herein, the term computer system 1400 is broadly used to describe any computing device that can store and independently run one or more programs. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

Each computer system 1400 may include a communication interface 1414 coupled to the bus 1406. The communication interface 1414 provides two-way communication between computer systems 1400. The communication interface 1414 of a respective computer system 1400 transmits and receives signals, e.g., electrical, electromagnetic or optical signals, that include data streams representing various types of information, e.g., instructions, messages and data. A communication link 1415 links one computer system 1400 with another computer system 1400. A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives signals, e.g., electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407. The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407. A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium" or "computer-readable medium" as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for implementing a dynamic cursor usage between multiple nodes in a computing system, comprising:
   determining cursor resource usage at a first node, the cursor resource usage at the first node related to cursor resource usage at a second node;
   determining if the cursor resource usage at the first node should be adjusted; and
   if the cursor resource usage at the first node should be adjusted, coordinating between the first node and the second node to dynamically adjust cursor usage, wherein the second node is remote to the first node.

2. The method of claim 1 in which the act of determining cursor resource usage comprises determining resource usage for cursor caching.

3. The method of claim 1 in which the act of determining if the cursor resource usage at the first node should be adjusted is based upon a change in operating conditions at the first node.

4. The method of claim 3 in which diminished system performance or worsened service times are detected.

5. The method of claim 1 in which the act of dynamically adjusting cursor usage comprises sizing one or more cursor caches.

6. The method of claim 5 in which the one or more cursor caches are located at both the first and second nodes.

7. The method of claim 5 in which a first cursor is closed at the first node and a second cursor is closed at the second node.

8. The method of claim 5 in which a first cursor is closed at the first node and related cursor resources are de-allocated at the second node.

9. The method of claim 1 in which the act of dynamically adjusting cursor usage comprises reconfiguring cursor caches at the first or second nodes.

10. The method of claim 1 in which the act of coordinating between the first node and the second node comprises communicating a message from the first node to the second node.

11. The method of claim 10 in which the message instructs the second node to reduce cursor resource usage.

12. The method of claim 1 in which the act of coordinating between the first node and the second node to dynamically adjust cursor usage comprises coordinating the selection of cursors to close.

13. The method of claim 1 in which the second node unilaterally selects a cursor to close at the second node.

14. The method of claim 13 in which another cursor at the first node is closed that is related to the cursor at the second node.

15. The method of claim 13 in which a least recently used selection process is used to select the cursor at the second node to close.

16. The method of claim 1 further comprising coordinating adjustment of cursor usage at one or more additional nodes.

17. The method of claim 1 in which the first node and the second node are two server nodes in a distributed system.

18. The method of claim 1 in which the first node and the second node are a client-server configuration in a distributed system.

19. A system for implementing a dynamic cursor usage between multiple nodes in a computing system, comprising:
   means for determining cursor resource usage at a first node, the cursor resource usage at the first node related to cursor resource usage at a second node;
   means for determining if the cursor resource usage at the first node should be adjusted; and
   means for coordinating between the first node and the second node to dynamically adjust cursor usage if the cursor resource usage at the first node should be adjusted, wherein the second node is remote to the first node.

20. The system of claim 19, wherein the means for determining cursor resource usage comprises means for determining resource usage for cursor caching.

21. The system of claim 19, wherein the means for determining if the cursor resource usage at the first node should be adjusted makes a determination based upon a change in operating conditions at the first node.

22. The system of claim 21, in which the determination is based on diminished system performance or worsened service times.

23. The system of claim 19, further comprising means for dynamically adjusting cursor usage by sizing one or more cursor caches.

24. The system of claim 19, further comprising means for dynamically adjusting cursor usage by reconfiguring cursor caches at the first or second nodes.

25. The system of claim 19, in which means for coordinating between the first node and the second node comprises means for communicating a message from the first node to the second node.

26. The system of claim 19 in which the second node comprises means for unilaterally selecting a cursor to close at the second node.

27. A computer program product comprising a tangible computer usable medium having executable code to execute a process for implementing a dynamic cursor usage between multiple nodes in a computing system, the process comprising:
- determining cursor resource usage at a first node, the cursor resource usage at the first node related to cursor resource usage at a second node;
- determining if the cursor resource usage at the first node should be adjusted; and
- if the cursor resource usage at the first node should be adjusted, coordinating between the first node and the second node to dynamically adjust cursor usage, wherein the second node is remote to the first node.

28. The computer program product of claim 27, in which the act of determining cursor resource usage comprises determining resource usage for cursor caching.

29. The computer program product of claim 27, in which the act of determining if the cursor resource usage at the first node should be adjusted is based upon a change in operating conditions at the first node.

30. The computer program product of claim 29, in which diminished system performance or worsened service times are detected.

31. The computer program product of claim 27, in which the act of dynamically adjusting cursor usage comprises sizing one or more cursor caches.

32. The computer program product of claim 27, in which the act of dynamically adjusting cursor usage comprises reconfiguring cursor caches at the first or second nodes.

33. The computer program product of claim 27, in which the act of coordinating between the first node and the second node comprises communicating a message from the first node to the second node.

34. The computer program product of claim 27, in which the second node unilaterally selects a cursor to close at the second node.

* * * * *